(12) United States Patent
Watanabe

(10) Patent No.: US 8,709,661 B2
(45) Date of Patent: Apr. 29, 2014

(54) POSITIVE ELECTRODE FOR SECONDARY BATTERY, AND SECONDARY BATTERY

(75) Inventor: Mikio Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 72 days.

(21) Appl. No.: 13/383,459

(22) PCT Filed: Jul. 21, 2010

(86) PCT No.: PCT/JP2010/062235
§ 371 (c)(1),
(2), (4) Date: Jan. 11, 2012

(87) PCT Pub. No.: WO2011/013552
PCT Pub. Date: Feb. 3, 2011

(65) Prior Publication Data
US 2012/0141875 A1    Jun. 7, 2012

(30) Foreign Application Priority Data

Jul. 29, 2009   (JP) .................................. 2009-176640

(51) Int. Cl.
*H01M 4/13* (2010.01)
*H01M 4/62* (2006.01)
*H01M 4/1393* (2010.01)
*H01M 4/133* (2010.01)
*H01M 4/587* (2010.01)
*H01M 10/0525* (2010.01)

(52) U.S. Cl.
CPC ............ *H01M 4/625* (2013.01); *H01M 4/1393* (2013.01); *H01M 4/133* (2013.01); *H01M 4/587* (2013.01); *H01M 10/0525* (2013.01); *Y02E 60/122* (2013.01)

USPC ........ 429/231.8; 429/209; 429/212; 429/213; 429/231.4; 429/231.95

(58) Field of Classification Search
CPC   Y02E 60/122; H01M 10/0525; H01M 4/625; H01M 4/1393
USPC ............. 429/324, 231.3, 231.4, 231.5, 231.8, 429/231.95, 209, 212, 213, 220
See application file for complete search history.

(56) References Cited

U.S. PATENT DOCUMENTS

| 4,791,037 | A  | * | 12/1988 | Anderman .................... 429/346 |
| 6,465,125 | B1 | * | 10/2002 | Takami et al. ................ 429/127 |
| 2004/0229124 | A1 | * | 11/2004 | Miyamoto et al. ......... 429/231.1 |
| 2009/0130561 | A1 | * | 5/2009 | Matsumoto et al. ....... 429/231.8 |
| 2009/0239145 | A1 |  | 9/2009 | Takebayashi et al. |

FOREIGN PATENT DOCUMENTS

| JP | 1999283628 | 10/1999 |
| JP | 2002279998 | 9/2002 |

(Continued)

*Primary Examiner* — Patrick Ryan
*Assistant Examiner* — Ben Lewis
(74) *Attorney, Agent, or Firm* — K&L Gates LLP

(57) ABSTRACT

Provided is a secondary battery capable of improving charge-discharge characteristics. A positive electrode active material layer of a positive electrode has a positive electrode active material and a positive electrode conductive agent. The positive electrode active material is a high-voltage operating positive electrode material whose operating voltage is equal to or more than 4.5 V on a lithium metal basis. The positive electrode conductive agent contains an amorphous carbon material and a crystalline carbon material, and an interplanar spacing for lattice plane (002), a specific surface area, and a content in the positive electrode active material layer, thereof are so normalized as to be in predetermined ranges, respectively.

7 Claims, 5 Drawing Sheets

(56) References Cited

FOREIGN PATENT DOCUMENTS

| | | |
|---|---|---|
| JP | 2003142101 | 5/2003 |
| JP | 2003257482 | 9/2003 |
| JP | 2006066341 | 3/2006 |
| JP | 2006244805 | 9/2006 |
| JP | 2007317582 | 12/2007 |
| WO | 2007052440 | 5/2007 |

* cited by examiner

POSITIVE ELECTRODE FOR SECONDARY BATTERY, AND SECONDARY BATTERY

CROSS REFERENCES TO RELATED APPLICATIONS

The present application is a national stage of International Application No. PCT/JP2010/062235 filed on Jul. 21, 2010 and claims priority to Japanese Patent Application No. 2009-176640 filed on Jul. 29, 2009, the disclosures of which are incorporated herein by reference.

BACKGROUND

The invention relates to a positive electrode for a secondary battery having a positive electrode active material layer containing a positive electrode active material and a positive electrode conductive agent, and to a secondary battery using the same.

Recently, portable electronic devices such as video cameras, digital still cameras, cellular phones, and lap-top computers have spread widely, resulting in a strong demand for these electronic devices with a small size, a lightweight, and a long-life. A development of a battery as a power supply, especially a small and lightweight secondary battery capable of achieving a high energy density is in progress accordingly.

In particular, expectations are very high for secondary batteries such as a lithium ion secondary battery that utilizes storage and release of lithium ions for a charge-discharge reaction, and a lithium metal secondary battery that utilizes deposition and dissolution of a lithium metal. One reason is that these make it possible to achieve a higher energy density than that achieved by a lead acid battery and a nickel-cadmium battery.

In recent years, advantages as being lightweight and high in energy density are suitable for applications in vehicles such as electric vehicles and hybrid electric vehicles, and thus research activities aiming for larger size and higher power of the secondary batteries are actively performed as well.

A secondary battery includes a positive electrode and a negative electrode together with an electrolyte. The positive electrode has a positive electrode active material layer on a positive electrode current collector. The positive electrode active material layer contains a positive electrode active material that contributes to a charge-discharge reaction.

Lithium-cobalt-based composite oxides such as a lithium cobalt oxide ($LiCoO_2$) are widely used as the positive electrode active material. However, it has disadvantages in terms of such as price and supply. Thus, lithium-manganese-based composite oxides which are low in price and low in supply instability are used as well.

In particular, a lithium manganate ($LiMn_2O_4$), which has a spinel structure and in which an operating voltage is about 4 V on a lithium metal basis, is low in cost and excellent in safety, which is thus put into practical use gradually in applications such as an electric tool application. Further, expectations are also high for applications in vehicles.

On the other hand, a lithium-manganese-based composite oxide of a high-voltage operation type, which has a spinel structure and in which an operating voltage is 4.5 V or more on the lithium metal basis, is under review in order to realize even more higher energy density. The lithium-manganese-based composite oxide can be that which has, in addition to manganese, other transition metal element, and a general expression thereof is expressed by $LiM_xMn_{2-x}O_4$ (where M is at least one kind of the transition metal elements other than manganese, and x is $0<x\leq 1$). The lithium-manganese-based composite oxide makes it possible to perform the charge-discharge reaction at a higher voltage as compared to normal, resulting in the higher energy density. Further, having the spinel structure allows oxygen to be less likely to be released even at a high temperature. Thereby, it is possible to achieve both the high energy density and the high safety at the same time.

Incidentally, when an oxide having a lower conductivity than that of a metal is used as the positive electrode active material, that oxide is mixed with a positive electrode conductive agent such as a carbon material which is high in conductivity. Generally, in this case, the positive electrode active material and the positive electrode conductive agent are dispersed such as in a solvent, in addition to a binder such as a polymer material, to provide slurry, following which the resultant is coated on the positive electrode current collector to form the positive electrode active material layer.

Materials such as amorphous carbon materials and crystalline carbon materials are used as the positive electrode conductive agent, which are mixed on an as-needed basis. In a case of the amorphous carbon materials, the conductivity tends to become high since the contact area between particles increases when the specific surface area is increased. On the other hand, in a case of the crystalline carbon materials, the conductivity tends to become high when the crystallinity becomes high.

Various proposals have been made for specific examples where a carbon material is used as the positive electrode conductive agent. For example, carbon black and black lead are used in combination as the positive electrode conductive agent, in order to improve properties such as a preservation property (for example, see Patent Document 1). To improve charge-discharge cycle characteristics under a high temperature environment, a 5 V-class lithium-manganese composite oxide is used as the positive electrode active material, and acetylene black and black lead are used as the positive electrode conductive agent (for example, see Patent Document 2). To improve high temperature cycle characteristics, a lithium-manganese composite oxide having a noble potential higher than 4.4 V to a potential of a lithium metal is used as the positive electrode active material, and a carbon material in which an interplanar spacing for lattice plane (002) is between 0.344 nm and 0.352 nm both inclusive is used as the positive electrode conductive agent (for example, see Patent Document 3). Incidentally, other than the carbon material, a metal nitride or a metal oxide is also used as the positive electrode conductive agent (for example, see Patent Document 4).

PRIOR ART DOCUMENT

Patent Document

Patent Document 1: Japanese Unexamined Patent Application Publication No. H11-283628
Patent Document 2: Japanese Unexamined Patent Application Publication No. 2003-257482
Patent Document 3: Japanese Unexamined Patent Application Publication No. 2006-066341
Patent Document 4: Japanese Unexamined Patent Application Publication No. 2003-142101

SUMMARY

In the past, an operating voltage of a positive electrode active material is 4.3 V or less on a lithium metal basis, and thus a carbon material used as a positive electrode conductive agent is electrochemically inactive during charging.

However, when the operating voltage is 4.5 V or over, an unintended phenomenon occurs in which an anion is inserted between layers of a crystalline carbon material during the charging and the anion is detached from the layers during discharging. This anion is a hexafluorophosphate ion ($PF_6^-$) when an electrolyte salt contained in an electrolyte is lithium hexafluorophosphate ($LiPF_6$). In this case, the crystalline carbon material repeats expansion and contraction during charging and discharging, by which the positive electrode active material layer is likely to be detached from a positive electrode current collector. This consequently lowers charge-discharge characteristics such as an initial efficiency and cycle characteristics.

Incidentally, a measure may be contemplated in which only an amorphous carbon material having no definite layer structure is used for the positive electrode conductive agent, in order to solve the issue discussed above. In this case, the unintended insertion and detachment of the anions do not occur, which means that the expansion and the contraction caused thereby do not occur. However, since the specific surface area of the amorphous carbon material has to be increased in order to obtain high conductivity about the same level as that obtained by using the crystalline carbon material, it is necessary to increase an amount of the amorphous carbon material. In this case, when the amount of the amorphous carbon material is excessive, a decomposing reaction of the electrolyte is likely to occur easily at the operating voltage of around 5 V, which, after all, results in the degradation of the charge-discharge characteristics.

The invention has been made in view of such problems, and an object thereof is to provide a positive electrode for a secondary battery capable of improving charge-discharge characteristics, and a secondary battery.

A positive electrode for a secondary battery according to one embodiment of the invention includes a positive electrode active material layer having a positive electrode active material and a positive electrode conductive agent. An operating voltage of the positive electrode active material is equal to or more than 4.5 V on a lithium metal basis. The positive electrode conductive agent contains an amorphous carbon material and a crystalline carbon material. In particular, as for the amorphous carbon material, a specific surface area lies between 50 $m^2$/g and 100 $m^2$/g both inclusive and a content in the positive electrode active material layer lies between 0.5 mass % and 5 mass % both inclusive. As for the crystalline carbon material, an interplanar spacing for lattice plane (002) is equal to or more than 0.340 nm when measured by an X-ray diffraction method, a specific surface area lies between 1 $m^2$/g to 5 $m^2$/g both inclusive, and a content in the positive electrode active material layer lies between 0.5 mass % to 5 mass % both inclusive. Also, a secondary battery according to one embodiment of the invention includes: a positive electrode including a positive electrode active material layer having a positive electrode active material and a positive electrode conductive agent; a negative electrode; and an electrolyte containing an electrolyte salt and a solvent. The positive electrode has a configuration similar to that of the positive electrode for the secondary battery described above.

In the positive electrode for the secondary battery or the secondary battery according to one embodiment of the invention, the interplanar spacing, the specific surface area, and the content of the amorphous carbon material as well as the specific surface area and the content of the crystalline carbon material, each serving as the positive electrode conductive agent, are so normalized as to be in predetermined ranges, respectively. Thus, even when the positive electrode material of a high-voltage operation type is used to repeat an electrode reaction (charge/discharge), detachment of the positive electrode active material layer caused by expansion and contraction is less likely to occur. Further, a conductivity of the positive electrode active material layer increases, and a decomposing reaction of the electrolyte is suppressed.

According to the positive electrode for the secondary battery of one embodiment of the invention, the positive electrode active material of the high-voltage operation type is used, and the interplanar spacing, the specific surface area, and the content of the positive electrode conductive agent (the amorphous carbon material and the crystalline carbon material) are so normalized as to be in predetermined ranges. Therefore, according to the secondary battery that uses the positive electrode for the secondary battery of one embodiment of the invention, it is possible to improve the charge-discharge characteristics.

Additional features and advantages are described herein, and will be apparent from the following Detailed Description and the figures.

DETAILED DESCRIPTION

An embodiment of the invention will be described in detail below with reference to drawings. The order of description is as follows.
1. First secondary battery (lithium ion secondary battery: cylinder type)
2. Second secondary battery (lithium ion secondary battery: laminate film type)
3. Third secondary battery (lithium-metal secondary battery)
[1. First Secondary Battery (Lithium Ion Secondary Battery: Cylinder Type)]

Figure 1:
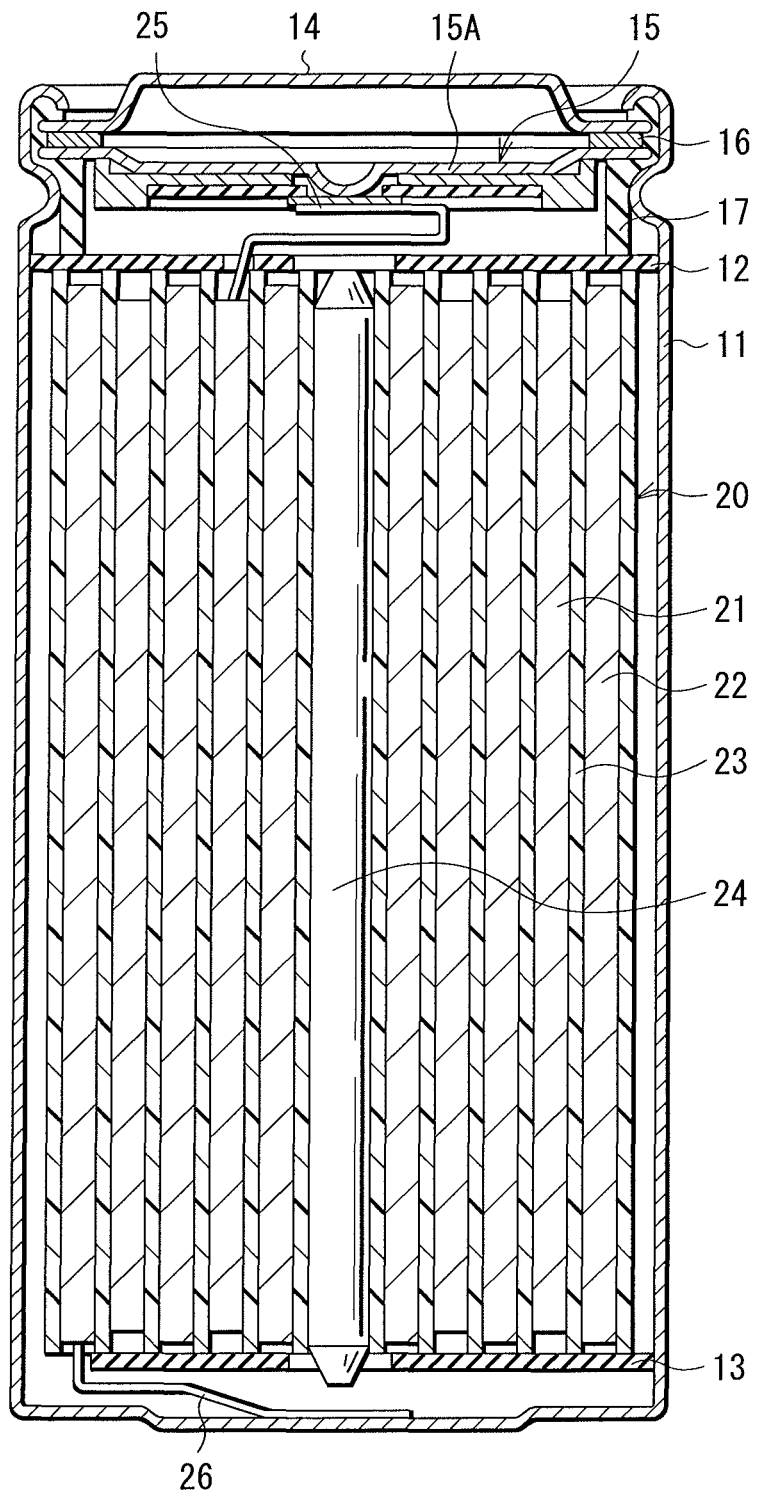
FIG. 1 A cross-sectional view illustrating a configuration of a first secondary battery (a cylinder type) according to one embodiment of the invention.
Figure 2:
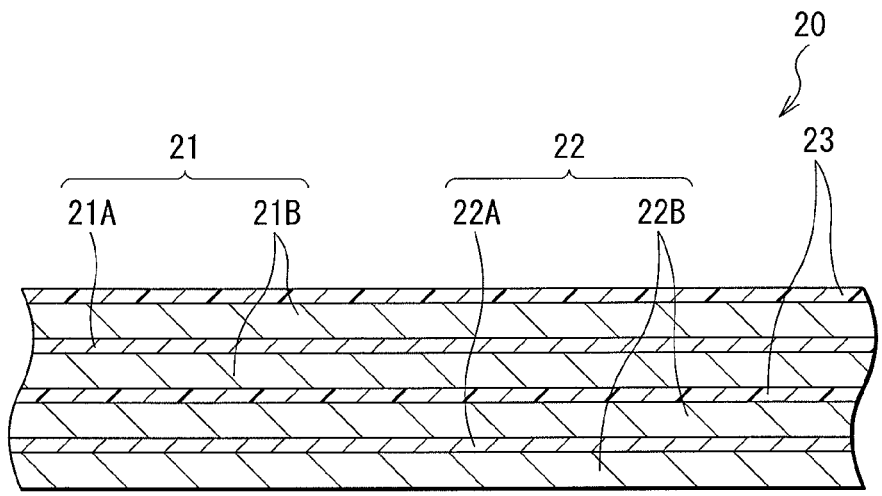
FIG. 2 A cross-sectional view illustrating a part of a coiled electrode body shown in FIG. 1 in an enlarged fashion.
Figure 3:
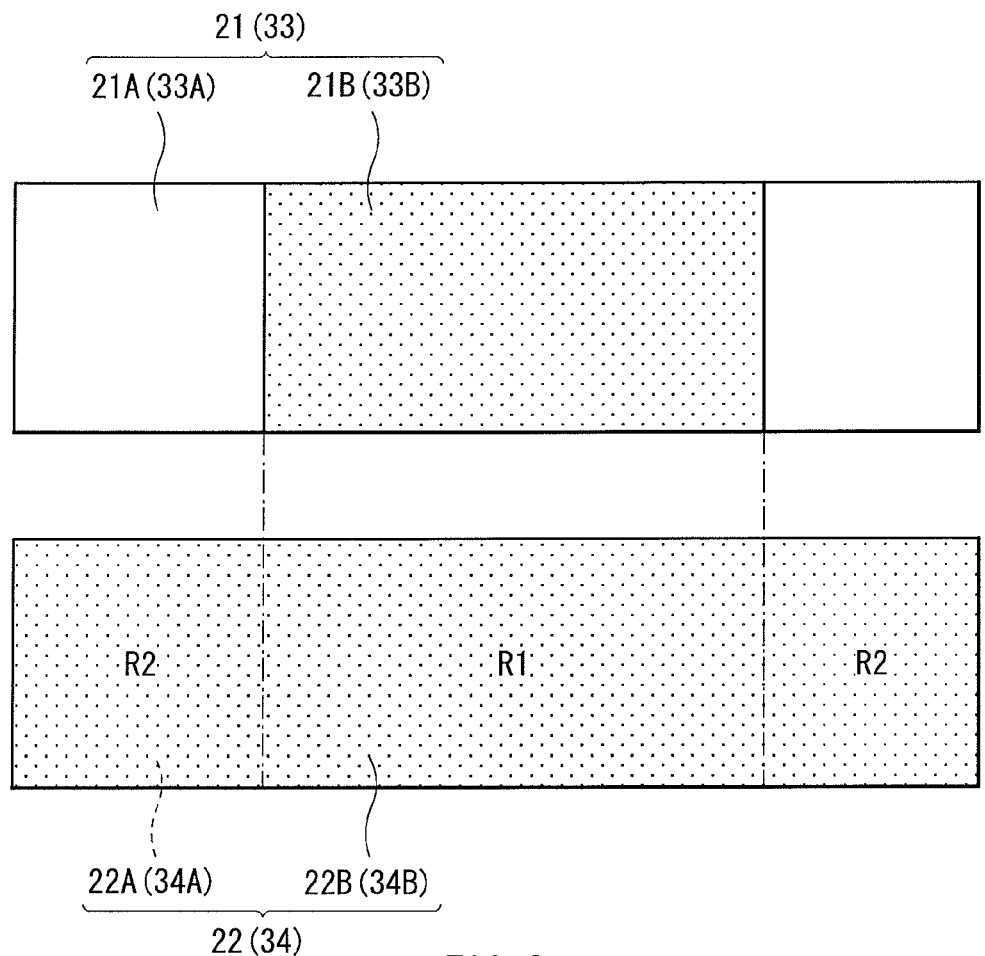
FIG. 3 A plain view illustrating configurations of a positive electrode and a negative electrode shown in FIG. 2.

First, a first secondary battery according to an embodiment of the invention will be described. FIGS. 1, 2, and 3 illustrate a cross-sectional configuration of the secondary battery, a part of a coiled electrode body 20 shown in FIG. 1, and planer configurations of a positive electrode 21 and a negative electrode 22 shown in FIG. 2, respectively. It is to be noted that a positive electrode for a secondary battery according to the invention is used as the positive electrode 21 of the secondary battery described herein.
[Overall Configuration of Secondary Battery]

This secondary battery is a lithium ion secondary battery in which a capacity of the negative electrode 22 is expressed by storage and release of lithium ions which are electrode reacting substances. As shown in FIG. 1, the coiled electrode body 20 and a pair of insulating plates 12 and 13 are accommodated in a battery can 11 having substantially a hollow cylindrical shape.

The battery can 11 may have, for example, a hollow structure in which one end is closed and the other end is opened, and may be configured by a metallic material such as iron (Fe), aluminum (Al), and an alloy thereof. A surface of the battery can 11 may be plated such as with nickel (Ni). The pair of insulating plates 12 and 13 are so disposed as to sandwich the coiled electrode body 20 from above and below, and as to extend vertically relative to a coiled peripheral surface thereof.

A battery cover 14 may be configured by a material similar to that of the battery can 11, for example. The battery cover 14, a safety valve mechanism 15, and a thermosensitive resistor device (Positive Temperature Coefficient: PTC device) 16 are swaged via a gasket 17 to the opened end of the battery can 11. The inside of the battery can 11 is sealed. The safety valve mechanism 15 and the thermosensitive resistor device 16 are provided at an inner side of the battery cover 14. The safety valve mechanism 15 is electrically connected to the battery cover 14 through the thermosensitive resistor device 16. In the safety valve mechanism 15, a disk plate 15A reverses to disconnect the electrical connection between the battery cover 14 and the coiled electrode body 20, when an internal pressure is equal to or exceeds a certain level due to such as an internal short-circuit or heating from the outside. The thermosensitive resistor device 16, since the resistance increases (limits a current) according to an increase in temperature, is configured to prevent abnormal heat generation caused by a large current. The gasket 17 may be configured by an insulating material, and a surface thereof may be coated with asphalt, for example.

As shown in FIG. 2, the coiled electrode body 20 is that in which the positive electrode 21 and the negative electrode 22 are laminated with a separator 23 in between and are coiled, and the center thereof may be inserted with a center pin 24. The positive electrode 21 is connected with a positive electrode lead 25 configured by a metallic material such as aluminum, and the negative electrode 22 is connected with a negative electrode lead 26 configured by a metallic material such as nickel. The positive electrode lead 25 is electrically connected to the battery cover 14 by such as being welded to the safety valve mechanism 15, and the negative electrode lead 26 is electrically connected to the battery can 11 by such as being welded thereto.

[Positive Electrode]

The positive electrode 21 may be that in which a positive electrode active material layer 21B is provided on both sides of a positive electrode current collector 21A, for example. However, the positive electrode active material layer 21B may be provided only on one side of the positive electrode current collector 21A.

The positive electrode current collector 21A may be configured by a metallic material such as aluminum, for example. The positive electrode active material layer 21B includes a positive electrode active material and a positive electrode conductive agent. The positive electrode active material is any one or two or more kinds of positive electrode materials capable of storing and releasing the lithium ions. However, the positive electrode active material layer 21B may include other materials such as a positive electrode binder on an as-needed basis.

An operating voltage of the positive electrode material is equal to or more than 4.5 V on a lithium metal basis. One reason is that the lithium ions are stored and released at a high voltage and thus an energy density becomes high. Such positive electrode material (hereinafter referred to as a "high-voltage operating positive electrode material") is not particularly limited. However, in particular, a material such as a lithium-manganese-based composite oxide having a spinel structure and a lithium-cobalt-phosphate compound (LiCoPO$_4$) having an olivine structure is preferable, in which a chemical formula of the lithium-manganese-based composite oxide is expressed by the following formula (1). One reason thereof is that it is readily available, and a sufficient energy density can be obtained.

$$\text{LiM}_x\text{Mn}_{2-x}\text{O}_4 \tag{1}$$

(where M is at least one kind of nickel, cobalt (Co), iron, chromium (Cr), and copper (Cu), and x is $0<x\leq1$).

Specific examples of the lithium-manganese-based composite oxide can be such as a lithium-nickel-manganese composite oxide (LiNi$_x$Mn$_{2-x}$O$_4$) and a lithium-chromium-manganese composite oxide (LiCr$_x$Mn$_{2-x}$O$_4$), and, more specifically, can be such as LiNi$_{0.5}$Mn$_{1.5}$O$_4$, LiNi$_{0.4}$Mn$_{1.6}$O$_4$, LiNi$_{0.3}$Mn$_{1.7}$O$_4$, and LiCr$_{0.5}$Mn$_{1.5}$O$_4$, for example.

It is to be noted that the positive electrode active material layer 21B, as long as the high-voltage operating positive electrode material is included therein as the positive electrode active material, may include other positive electrode material in addition thereto. As other positive electrode material, a lithium-containing compound (except for that which corresponds to the high-voltage operating positive electrode material) is preferable, since a high energy density can be obtained. The lithium-containing compound can be such as a composite oxide having lithium (Li) and a transition metal element as constituent elements, and a phosphate compound having lithium and a transition metal element as constituent elements, for example. In particular, the one having at least one kind of cobalt, nickel, manganese, and iron as the transition metal element is preferable, since a higher energy density can be obtained. A chemical formula thereof may be expressed by Li$_x$M1O$_2$ or Li$_y$M2PO$_4$, for example, where M1 and M2 are one or more kinds of transition metal elements. Values of x and y vary according to a charging-discharging state, which are normally $0.05\leq x\leq1.10$ and $0.05\leq y\leq1.10$, respectively.

The composite oxide having lithium and the transition metal element can be such as lithium cobaltate (Li$_x$CoO$_2$), lithium nickel oxide (Li$_x$NiO$_2$), and a lithium-nickel-based composite oxide expressed by the following formula (2), for example. Also, the phosphate compound having lithium and the transition metal element can be such as a lithium-iron phosphate compound (LiFePO$_4$) and a lithium-iron-manganese phosphate compound (LiFe$_{1-u}$Mn$_u$PO$_4$ (u<1)), for example, since this makes it possible to obtain a high battery capacity and to obtain excellent cycle characteristics as well.

$$\text{LiNi}_{1-y}\text{M}_y\text{O}_2 \tag{2}$$

(where M is at least one kind of cobalt, iron, aluminum, vanadium (V), tin (Sn), magnesium (Mg), titanium (Ti), strontium (Sr), calcium (Ca), zirconium (Zr), molybdenum (Mo), technetium (Tc), ruthenium (Ru), tantalum (Ta), tungsten (W), rhenium (Re), ytterbium (Y), copper, zinc (Zn), barium (Ba), boron (B), chromium, silicon (Si), gallium (Ga), phosphorus (P), antimony (Sb), and niobium (Nb), and x is $0.005<x<0.5$).

Also, other positive electrode material can be such as an oxide, a disulfide, a chalcogenide, and a conductive polymer, for example. The oxide can be such as a titanium oxide, a vanadium oxide, and a manganese dioxide, for example. The disulfide can be such as a titanium disulfide and a molybdenum sulfide, for example. The chalcogenide can be such as a niobium selenide, for example. The conductive polymer can be such as sulfur, polyaniline, and polythiophen, for example.

Two or more kinds of other positive electrode materials described above may be mixed in an optional combination. Also, other positive electrode material may be other than those described above.

The positive electrode conductive agent includes two kinds of carbon materials which are different in crystallinity (an amorphous carbon material and a crystalline carbon material). One reason why the amorphous carbon material is included is that, even when the high-voltage operating positive electrode material is used, unintentional insertion and detachment of anions in the positive electrode conductive agent are suppressed. As a result, the positive electrode active material layer 21B is less likely to expand and contract, and is thus less likely to be detached from the positive electrode current collector 21A. On the other hand, one reason why the crystalline carbon material is included is that the conductivity becomes high without increasing excessively the content of the positive electrode conductive agent in the positive electrode active material layer 21B, and that a decomposing reaction of the electrolyte is suppressed.

In particular, as to the amorphous carbon material, the specific surface area is equal to or more than 50 $m^2/g$ and equal to or less than 100 $m^2/g$, and the content of the amorphous carbon material in the positive electrode active material layer 21B is equal to or more than 0.5 mass % and equal to or less than 5 mass %, since a function of the amorphous carbon material described above is exhibited remarkably. It is to be noted that other conditions related to the amorphous carbon material such as a particle size are optional, as long as the conditions of the specific surface area and the content described above are satisfied.

The amorphous carbon material is not particularly limited, and one kind or two or more kinds may be used. In particular, acetylene black is preferable, since the acetylene black is readily available and a function of the amorphous carbon material is exhibited sufficiently.

As to the crystalline carbon material, an interplanar spacing for lattice plane (002) obtained by an X-ray diffraction is equal to or more than 0.340 nm, and is preferably equal to or more than 0.340 nm and equal to or less than 0.343 nm. Also, the specific surface area of the crystalline carbon material is equal to or more than 1 $m^2/g$ and equal to or less than 5 $m^2/g$, and the content of the crystalline carbon material in the positive electrode active material layer 21B is equal to or more than 0.5 mass % and equal to or less than 5 mass %, since a function of the crystalline carbon material described above is exhibited remarkably. It is to be noted that other conditions related to the crystalline carbon material such as a particle size are optional, as long as the conditions of the interplanar spacing, the specific surface area, and the content described above are satisfied.

The crystalline carbon material is not particularly limited, and one kind or two or more kinds may be used. In particular, black lead is preferable, since the black lead is readily available and a function of the crystalline carbon material is exhibited remarkably.

The interplanar spacing for the lattice plane (002) is measured for a powdered sample, using an X-ray diffractometer named "RINT 2000" (an X-ray source is CuKα) available from Rigaku Corporation. Also, the specific surface area is measured using a BET specific surface area measuring instrument named "HM-1208" available from Mountech Company Limited. To describe a definition of the amorphous carbon material in the invention for confirmation, an interplanar spacing for the lattice plane (002) measured by the X-ray diffractometer described above is about 0.350 nm, and a crystallite size LC in a c-axis direction is about equal to or more than 1 nm and equal to or less than 5 nm.

It is to be noted that the positive electrode conductive agent, as long as the amorphous carbon material and the crystalline carbon material are included therein, may include other conductive material in addition thereto. Other conductive material can be such as a metallic material and a conductive polymer, for example.

The positive electrode binder can be a polymer material such as polyvinylidene fluoride and Teflon (Registered Trademark), for example.

A mass ratio (the positive electrode active material:the positive electrode conductive agent:the positive electrode binder) when the positive electrode active material layer 21B includes the positive electrode active material and the positive electrode conductive agent in addition to the positive electrode binder is not particularly limited, and may be (100−a−b):a:b (0.5≤a≤10, 1≤b≤10), for example.

[Negative Electrode]

The negative electrode 22 may be that in which a negative electrode active material layer 22B is provided on both sides of a negative electrode current collector 22A. However, the negative electrode active material layer 22B may be provided only on one side of the negative electrode current collector 22A.

The negative electrode current collector 22A may be configured by a metallic material such as copper, nickel, and a stainless steel, for example. It is preferable that a surface of the negative electrode current collector 22A be roughened, because a property of close-attachment of the negative electrode active material layer 22B to the negative electrode current collector 22A increases by a so-called anchor effect. In this case, the surface of the negative electrode current collector 22A may be made rough at least in a region facing the negative electrode active material layer 22B. A method for making the surface rough can be such as a method in which fine particles are formed by an electrolytic treatment. The electrolytic treatment is a method in which the fine particles are formed on the surface of the negative electrode current collector 22A by an electrolytic process in an electrolytic cell to provide an asperity. In general, a copper foil fabricated by the electrolytic process is called an "electrolytic copper foil".

The negative electrode active material layer 22B includes any one or two or more kinds of negative electrode materials capable of storing and releasing the lithium ions as a negative electrode active material, and may include other materials such as a negative electrode binder and a negative electrode conductive agent on an as-needed basis. In the negative electrode active material layer 22B, it is preferable that a chargeable capacity of the negative electrode material be larger than a discharge capacity of the positive electrode 21, in order to prevent unintended deposition of a lithium metal at the time of charging and discharging.

The negative electrode material can be a carbon material, for example. This is because a change in a crystalline structure is extremely small during the storage and the release (insertion and detachment) of the lithium ions, and thus the high energy density and the excellent cycle characteristics are achieved. This is also because it functions as the negative electrode conductive agent as well. The carbon material can be such as a graphitizable carbon, a non-graphitizable carbon having an interplanar spacing for the lattice plane (002) of equal to or more than 0.37 nm, and a black-lead having an interplanar spacing for the lattice plane (002) of equal to or less than 0.34 nm, for example. More specifically, it can be such as a pyrolytic carbon group, a coke group, a glass-like carbon fiber, a baked organic polymer compound, an activated carbon, and a carbon black group. The coke group includes such as a pitch coke, a needle coke, and a petroleum coke. The baked organic polymer compound refers to a resultant in which a resin such as a phenol resin and a fran resin is baked at a suitable temperature and carbonized. Incidentally, a form of the carbon material may be any one of a fibrous form, a spherical form, a granular form, and a scale-like form.

Also, the negative electrode material can be a material (a metallic material) having one kind or two or more kinds of metal elements and metalloid elements as a constituent element, for example. One reason is that the high energy density is obtained. The metallic material may be a single body, an alloy, or a compound of the metal element or the metalloid element, may be two or more kinds thereof, or may be that which has, at least partially, a phase of one kind or two or more kinds thereof. It is to be noted that the "alloy" in the invention encompasses not only alloys including two or more kinds of metal elements, but also alloys including one or more kinds of metal elements and one or more kinds of metalloid elements. Also, the "alloy" may have a non-metallic element. A composition thereof can be such as a solid solution, an eutectic material (an eutectic mixture), an intermetallic compound, and a composition in which two or more kinds thereof are present at the same time.

The metal element or the metalloid element described above may be, for example, a metal element or a metalloid element capable of forming an alloy with lithium, and is, specifically, one kind or two or more kinds of the following elements: magnesium, boron, aluminum, gallium, indium (In), silicon, germanium (Ge), tin, and lead (Pb). Bismuth (Bi), cadmium (Cd), silver (Ag), zinc, hafnium (Hf), zirconium, yttrium (Y), palladium (Pd), and platinum (Pt). In particular, at least one of silicon and tin is preferable, since they have excellent capability of storing and releasing the lithium ions and thus the high energy density can be achieved.

A material having at least one of silicon and tin may be a single body, an alloy, or a compound of silicon or tin, may be two or more kinds thereof, or may be that which has, at least partially, a phase of one kind or two or more kinds thereof, for example.

The alloy of silicon, for example, can be such as that which has one kind or two or more kinds of the following elements as a constituent element other than silicon: tin, nickel, copper, iron, cobalt, manganese, zinc, indium, silver, titanium, germanium, bismuth, antimony, and chromium. The compound of silicon can be such as that which has oxygen or carbon as a constituent element other than silicon, for example. It is to be noted that the compound of silicon may have, as a constituent element other than silicon, any one or any two or more kinds of the elements described for the alloy of silicon.

The alloys or the compounds of silicon can be, for example, those as follows: $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, or $Cu_5Si$. $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq 2$), $SnO_w$ ($0<w\leq 2$), or $LiSiO$.

The alloy of tin, for example, can be such as that which has one kind or two or more kinds of the following elements as a constituent element other than tin: silicon, nickel, copper, iron, cobalt, manganese, zinc, indium, silver, titanium, germanium, bismuth, antimony, and chromium. The compound of tin can be such as that which has oxygen or carbon, for example. It is to be noted that the compound of tin may have, as a constituent element other than tin, any one or any two or more kinds of the elements described for the alloy of tin. The alloy or the compound of tin can be such as $SnSiO_3$, $LiSnO$, and $Mg_2Sn$, for example.

In particular, the single body of silicon is preferable for the material having silicon (a silicon-containing material), since those such as the high battery capacity and the excellent cycle characteristics are obtained. Note that the "single body" simply refers to a single body in a general sense (i.e., may include a slight amount of impurities), and does not necessarily mean a 100% purity.

Also, as the material having tin (a tin-containing material), a material is preferable that may have tin for a first constituent element, and second and third constituent elements in addition thereto, for example. The second constituent element, for example, can be one kind or two or more kinds of the following elements: cobalt, iron, magnesium, titanium, vanadium, chromium, manganese, nickel, copper, zinc, gallium, and zirconium. Niobium, molybdenum, silver, indium, cerium (Ce), hafnium, tantalum, tungsten, bismuth, and silicon. The third constituent element, for example, can be one kind or two or more kinds of boron, carbon, aluminum, and phosphorus. One reason is that those such as the high battery capacity and the excellent cycle characteristics are obtained.

In particular, a material having tin, cobalt, and carbon as the constituent elements is preferable (a SnCoC-containing material). A composition thereof has, for example, the content of carbon which is equal to or more than 9.9 mass % and equal to or less than 29.7 mass %, and a content ratio of tin and cobalt (Co/(Sn+Co)) which is equal to or more than 20 mass % and equal to or less than 70 mass %. One reason is that the high energy density is obtained.

The SnCoC-containing material has a phase including tin, cobalt, and carbon. It is preferable that the phase thereof be low in crystallinity or amorphous. This phase is a phase capable of reacting with lithium (a reaction layer), and excellent characteristics can be obtained by the presence of that reaction phase. A half width of a diffraction peak obtained by an X-ray diffraction of the reaction phase is preferably equal to or more than 1.0 degrees at a diffraction angle $2\theta$, where a $CuK\alpha$ ray is used as a specific X-ray and a sweeping rate is $1°/min$. One reason is that the lithium ions are stored and released smoothly, and reactivity to the electrolyte or the like is reduced. It is to be noted that the SnCoC-containing material may include, in addition to the low crystallinity phase and the amorphous phase, a phase including a single body of or a part of a constituent element.

Whether a diffraction peak obtained by the X-ray diffraction corresponds to the reaction phase or not can be determined easily by comparing X-ray diffraction charts obtained respectively before and after an electrochemical reaction with the lithium. For example, it corresponds to the reaction phase when a position of the diffraction peak is changed before and after of the electrochemical reaction with lithium. In this case, the diffraction peak of the reaction phase is obtained in a range of $2\theta=20°$ to $50°$, for example. Such reaction phase includes a series of constituent elements described above, and is considered to be low-crystallized or amorphized primarily due to the presence of carbon.

In the SnCoC-containing material, it is preferable that at least a part of carbon serving as the constituent element be bonded to the metal element or the metalloid element serving as other constituent element, since this suppresses condensation or crystallization of such as tin. A state of bonding of elements may be confirmed by an X-ray photoelectron spectroscopy (XPS: x-ray photoelectron spectroscopy), for example. In commercially-available equipment, an Al—$K\alpha$ ray, an Mg—$K\alpha$ ray, or the like is used as a soft X-ray, for example. When at least a part of carbon is bonded such as to the metal element and the metalloid element, a peak of a composite wavelength of 1s-orbital (C1s) of carbon appears in a lower region than 284.5 eV, where an energy calibration is carried out such that a peak of 4f-orbital (Au4f) of a gold atom is obtained at 84.0 eV. At this time, since a surface-contaminating carbon is normally present on a substance surface, a peak of C1s of the surface-contaminating carbon is defined as 284.8 eV, which is defined as an energy reference. In the XPS, a waveform of the peak of C1s is measured in a form that includes the peak of the surface-contaminating carbon and the peak of carbon in the SnCoC-containing material. Thus, commercially-available software may be used for analysis to separate those peaks from each other, for example. In the analysis of the waveform, a position of a main peak present on the minimum biding energy side is defined as the energy reference (284.8 eV).

It is to be noted that the SnCoC-containing material may further include at least one kind of the following elements on an as-needed basis: silicon, iron, nickel, chromium, indium, niobium, germanium, titanium, molybdenum, aluminum, phosphorus, gallium, and bismuth.

Other than the SnCoC-containing material, a material is also preferable as the tin-containing material that has tin, cobalt, iron, and carbon as the constituent elements (a SnCoFeC-containing material). A composition of the SnCoFeC-containing material can be set optionally. For example, a composition of a case where the lower content of iron is set may be as follows. The content of carbon is equal to or more than 9.9 mass % and equal to or less than 29.7 mass %. The content of iron is equal to or more than 0.3 mass % and equal to or less than 5.9 mass %. A ratio of the content of tin and cobalt (Co/(Sn+Co)) is equal to or more than 30 mass % and equal to or less than 70 mass %. Also, for example, a composition of a case where the higher content of iron is set may be as follows. The content of carbon is equal to or more than 11.9 mass % and equal to or less than 29.7 mass %. In addition, a ratio of content of tin, cobalt, and iron ((Co+Fe)/(Sn+Co+Fe)) is equal to or more than 26.4 mass % and equal to or less than 48.5 mass %, and a ratio of the content of cobalt and iron (Co/(Co+Fe)) is equal to or more than 9.9 mass % and equal to or less than 79.5 mass %. One reason is that the high energy density is obtained. A property or the like (such as a half width) of the SnCoFeC-containing material is similar to that of the SnCoC-containing material.

Also, the negative electrode material can be such as a metallic oxide and a polymeric compound, for example. The metallic oxide can be such as an iron oxide, a ruthenium oxide, and a molybdenum oxide, for example. The polymeric compound can be such as polyacetylene, polyaniline, and polypyrrole, for example.

Two or more kinds of the series of negative electrode materials described above may be mixed in an optional combination. Also, the negative electrode material may be other than those described above.

The negative electrode active material layer 22B may be formed by a coating method, a vapor phase method, a liquid phase method, a spraying method, a baking method (a sintering method), or by the two or more kinds of those methods, for example. The coating method refers to a method in which the negative electrode active material is mixed with such as a binder, following which the resultant is dispersed in such as a solvent to coat the same, for example. Examples of the vapor phase method include such as a physical deposition method and a chemical deposition method, which can be, more specifically, such as a vacuum deposition method, a sputtering method, an ion-plating method, a laser ablation method, a chemical vapor deposition (chemical vapor deposition: CVD) method, and a plasma chemical vapor deposition method. Examples of the liquid phase method include such as an electrolytic plating method and a non-electrolytic plating method. The spraying method refers to a method in which the negative electrode material is sprayed in a melted state or in a half-melted state. The baking method refers to a method in which a coating is performed by a similar procedure to that of the coating method, following which a heat treatment is performed at a higher temperature than a melting point of the binder or the like, for example. As for the baking method, a known technique can be used, examples of which include such as an atmosphere baking method, a reaction-baking method, and a hot-press baking method.

Here, in the positive electrode 21 and the negative electrode 22, the positive electrode active material layer 21B is provided in a partial region of a surface of the positive electrode current collector 21A, whereas the negative electrode active material layer 22B is provided in the entire region of a surface of the negative electrode current collector 22A, as shown in FIG. 3, for example. Thus, the negative electrode active material layer 22B is provided in a region opposing the positive electrode active material layer 21B (an opposing region R1) and in a region not opposing the positive electrode active material layer 21B (a non-opposing region R2). It is to be noted that the negative electrode active material layer 22B may be provided in a partial region of the surface of the negative electrode current collector 22A when the opposing region R1 and the non-opposing region R2 are present. In this case, a portion of the negative electrode active material layer 22B that is provided in the opposing region R1 is responsible for charging and discharging reactions, but a portion that is provided in the non-opposing region R2 is not responsible for the charging and discharging reactions. Incidentally, the positive electrode active material layer 21B and the negative electrode active material layer 22B are shown shaded in FIG. 3.

As described above, the positive electrode conductive agent includes the amorphous carbon material and the crystalline carbon material, and the interplanar spacing, the specific surface area, and the content thereof are so set as to be in predetermined ranges, respectively. However, when the negative electrode active material layer 22B undergoes the charging and discharging reactions, the positive electrode conductive agent is likely to deform, be destroyed, or be lost by receiving a dynamic influence caused at the time of that charging and discharging. Thus, in the opposing region R1, a state of the positive electrode conductive agent is under a circumstance that the state is likely to be changed easily from a state which is immediately after the formation of the positive electrode active material layer 21B. In contrast, in the non-opposing region R2, the state of the positive electrode conductive agent is less susceptible to the influence at the time of that charging and discharging, whereby the state is maintained as is from the state immediately after the formation of the positive electrode active material layer 21B. Thus, it is preferable that, when examining the interplanar spacing, the specific surface area, and the content described above, the examination be performed for the positive electrode active material layer 21B in the non-opposing region R2. One reason is that, since it is not influenced by the charge and discharge history, a state of the positive electrode conductive agent can be examined precisely with high repeatability.

[Separator]

The separator 23 isolates the positive electrode 21 and the negative electrode 22 from each other, and allows the lithium ions to pass therethrough while preventing a short circuit of a current caused by contacting of both poles. The separator 23 may be a porous membrane configured of such as a synthetic resin and a ceramic, or may be that in which two or more kinds of porous membranes are stacked, for example. The synthetic resin can be such as polytetrafluoroethylene, polypropylene, and polyethylene, for example.

[Electrolyte]

The separator 23 is impregnated with an electrolyte. The electrolyte is that in which an electrolyte salt is dissolved in a solvent, and, on an as-needed basis, may include other materials such as various kinds of additives.

The solvent may include any one or more kinds of non-aqueous solvents such as an organic solvent, for example. A series of solvents (non-aqueous solvents) described below may be used solely, or two or more kinds thereof may be used in a mixed fashion.

For example, the non-aqueous solvent can be such as those as follows. Ethylene carbonate, propylene carbonate, butylene carbonate, dimethyl carbonate, diethyl carbonate, ethylmethyl carbonate, methylpropyl carbonate, gamma-butyrolactone, gamma-valerolactone, 1,2-dimethoxyethane, or tetrahydrofuran. 2-methyltetrahydrofuran, tetrahydropyran, 1,3-dioxolane, 4-methyl-1,3-dioxolane, 1,3-dioxane, or 1,4-dioxan. Methyl acetate, ethyl acetate, methyl propionate, ethyl propionate, methyl lactate, methyl isobutyrate, methyl trimethylacetate, or ethyl trimethylacetate. Acetonitrile, glutaronitrile, adiponitrile, methoxyacetonitrile, 3-methoxypropionitrile, N,N-dimethylformamide, N-methylpyrrolidinone, or N-methyl-oxazolidinone. N,N'-dimethyl-imidazolidinone, nitromethane, nitroethane, sulfolane, trimethyl phosphate, or dimethylsulfoxide. One reason is that an excellent battery capacity, cycle characteristics, and preservation characteristics are obtained.

In particular, at least one kind of ethylene carbonate, propylene carbonate, dimethyl carbonate, diethyl carbonate, and ethylmethyl carbonate is preferable, since those such as the excellent battery capacity, the cycle characteristics, and the preservation characteristics are achieved. In this case, a combination of: a high viscosity (a high dielectric constant) solvent (for example, a relative dielectric constant $\in$ of $\geq 30$) such as ethylene carbonate and propylene carbonate; and a low viscosity solvent (for example, a viscosity of $\leq 1$ mPa·s) such as dimethyl carbonate, ethylmethyl carbonate, and diethyl carbonate, is more preferable. One reason is that a dissociating property of the electrolyte salt and a mobility of ions are improved.

Incidentally, the solvent may include one or two or more kinds of chain halogenated carbonate esters and cyclic halogenated carbonate esters. One reason is that, since a stable protective film is formed on the surface of the negative electrode 22 during charging and discharging, the decomposing reaction of the electrolyte is suppressed. Note that the term "halogenated" means that at least a part of hydrogen is substituted by halogen. The chain halogenated carbonate ester can be such as fluoromethylmethyl carbonate, bis(fluoromethyl) carbonate, and difluoromethylmethyl carbonate, for example. The cyclic halogenated carbonate ester can be such as 4-fluoro-1,3-dioxolane-2-one and 4,5-difluoro-1,3-dioxolane-2-one, for example. Note that the cyclic halogenated carbonate ester includes a geometric isomer as well. The contents of the chain halogenated carbonate ester and the cyclic halogenated carbonate ester in the solvent are equal to or more than 0.01 weight % and equal to or less than 50 weight %, for example.

Also, the solvent may include a cyclic carbonate ester having an unsaturated carbon bond. One reason is that, since a stable protective film is formed on the surface of the negative electrode 22 during charging and discharging, the decomposing reaction of the electrolyte is suppressed. The cyclic carbonate ester having the unsaturated carbon bond can be such as vinylene carbonate and vinylethylene carbonate, for example, and the content thereof in the solvent is equal to or more than 0.01 weight % and equal to or less than 10 weight %, for example.

Further, the solvent may include a sultone (cyclic sulfonate ester) or an acid anhydride. One reason is that a chemical stability of the electrolyte is improved. The sultone can be such as propane sultone and propene sultone, for example, and the content thereof in the solvent is equal to or more than 0.5 weight % and equal to or less than 5 weight %, for example. The acid anhydride can be such as a carboxylic acid anhydride, a disulfonic acid anhydride, and a carboxylic acid sulfonic acid anhydride, for example. The carboxylic acid anhydride can be such as a succinic anhydride, a glutaric anhydride, and a maleic acid anhydride, for example. The disulfonic acid anhydride can be such as an ethane disulfonic acid anhydride and a propane disulfonic acid anhydride, for example. The carboxylic acid sulfonic acid anhydride can be such as a sulfobenzoic acid anhydride, a sulfopropionic acid anhydride, and a sulfobutyric acid anhydride, for example. The content of the acid anhydride in the solvent is equal to or more than 0.5 weight % and equal to or less than 5 weight %.

The electrolyte salt may include any one or two or more kinds of light metal salts such as a lithium salt, for example. A series of electrolyte salts described below may be used solely, or two or more kinds thereof may be used in a mixed fashion.

For example, the lithium salt can be such as those as follows. Lithium hexafluorophosphate ($LiPF_6$), lithium tetrafluoroborate ($LiBF_4$), lithium perchloride ($LiClO_4$), or lithium tetrafluoroarsenate ($LiAsF_6$). Lithium tetraphenylborate ($LiB(C_6H_5)_4$), lithium methansulfonic acid ($LiCH_3SO_3$), lithium trifluoromethane-sulfonic acid ($LiCF_3SO_3$), or lithium tetrachloroaluminate ($LiAlCl_4$). Di-lithium tetrafluorosilicate ($Li_2SiF_6$), lithium chloride ($LiCl$), or lithium borate ($LiBr$). One reason is that the excellent battery capacity, the cycle characteristics, and the preservation characteristics are obtained.

In particular, one or two or more kinds of lithium hexafluorophosphate, lithium tetrafluoroborate, lithium perchloride, and lithium tetrafluoroarsenate are preferable. Further, in this case, at least one of lithium hexafluorophosphate and lithium tetrafluoroborate is more preferable, and lithium hexafluorophosphate is even more preferable. One reason is that an internal resistance is reduced, by which a higher effect is obtained.

It is preferable that the content of the electrolyte salt be equal to or more than 0.3 mol/kg and equal to or less than 3.0 mol/kg for the solvent. One reason is that a high ionic conductivity is achieved.

[Operation of Secondary Battery]

In this secondary battery, the lithium ions are released from the positive electrode 21 and are stored in the negative electrode 22 through the electrolyte impregnated in the separator 23 at the time of charging, for example. On the other hand, the lithium ions are released from the negative electrode 22 and are stored in the positive electrode 21 through the electrolyte impregnated in the separator 23 at the time of discharging, for example.

[Manufacturing Method of Secondary Battery]

This secondary battery may be manufactured by a procedure described below, for example.

First, the electrode 21 is fabricated. At the beginning, the positive electrode active material and the positive electrode conductive agent are mixed with such as the positive electrode binder on an as-needed basis to provide a positive electrode mixture, following which the same is dispersed in an organic solvent to provide paste-like positive electrode mixture slurry. Then, the positive electrode mixture slurry is coated on the positive electrode current collector 21A to form the positive electrode active material layer 21B. Lastly, the positive electrode active material layer 21B is subjected to compression molding by using such as a roll pressing machine, while heating the same as necessary. In this case, the compression molding may be repeated more than once.

Next, the negative electrode active material layer 22B is formed on the negative electrode current collector 22A to fabricate the negative electrode 22. In this case, a formation procedure similar to that of the positive electrode 21 described above may be used. More specifically, a negative electrode mixture, in which the negative electrode active material is mixed with such as, on an as-needed basis, the negative electrode binder and the negative electrode conductive agent, is dispersed in an organic solvent to provide paste-like negative electrode mixture slurry, following which the same is coated on both sides of the negative electrode current collector 22A, and, as necessary, the compression molding is performed. Alternatively, a formation procedure may be used which is different from that of the positive electrode 21. More specifically, a vapor phase method such as an evaporation method is used to deposit a negative electrode material on both sides of the negative electrode current collector 22A.

Lastly, the positive electrode 21 and the negative electrode 22 as well as the electrolyte are used to assemble the secondary battery. First, the positive electrode lead 25 is connected to the positive electrode current collector 21A, and the negative electrode lead 26 is connected to the negative electrode current collector 22A. Then, the positive electrode 21 and the negative electrode 22 are laminated with the separator 23 in between and are winded to fabricate the coiled electrode body 20, following which the center pin 24 is inserted into the center of the winding. Then, the coiled electrode body 20 is accommodated in the battery can 11 while sandwiching the same with the pair of insulating plates 12 and 13. In this case, a tip of the positive electrode lead 25 is connected to the safety valve mechanism 15, and a tip of the negative electrode lead 26 is connected to the battery can 11. Then, the electrolyte is injected in the battery can 11 to impregnate the same in the separator 23. Lastly, the battery cover 14, the safety valve mechanism 15, and the thermosensitive resistor device 16 are swaged via the gasket 17 to the opened end of the battery can 11. Thereby, the secondary battery shown in FIG. 1 to FIG. 3 is completed.

According to this first secondary battery, the interplanar spacing, the specific surface area, and the content of the positive electrode conductive agent (the amorphous carbon material and the crystalline carbon material) are so normalized as to be in predetermined ranges, respectively, in a case where the high-voltage operating positive electrode material is used as the positive electrode active material. In this case, the positive electrode active material layer 21B becomes less likely to expand and contract and is thus less likely to be detached from the positive electrode current collector 21A, as compared with a case where the interplanar spacing and so forth are not normalized even when a positive electrode active material and a positive electrode conductive agent which are similar to those of the present embodiment are used. Further, a conductivity of the positive electrode active material layer 21B increases, and the decomposing reaction of the electrolyte is suppressed. Therefore, it is possible to improve charge-discharge characteristics.

[2. Second Secondary Battery (Lithium Ion Secondary Battery: Laminate Film Type)]

Figure 4:
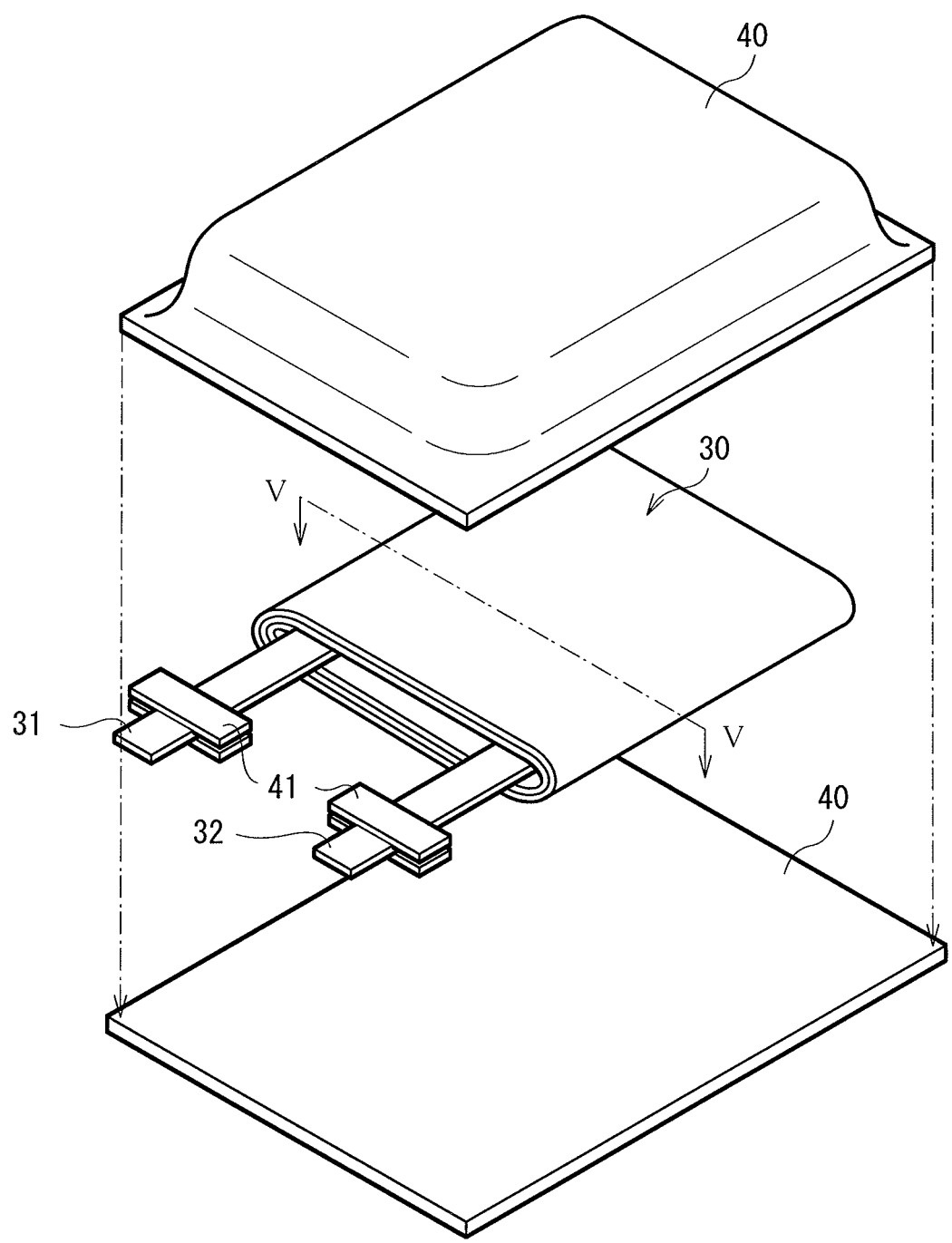
FIG. 4 An exploded perspective view illustrating a configuration of a second secondary battery (a laminate film type) according to one embodiment of the invention.
Figure 5:
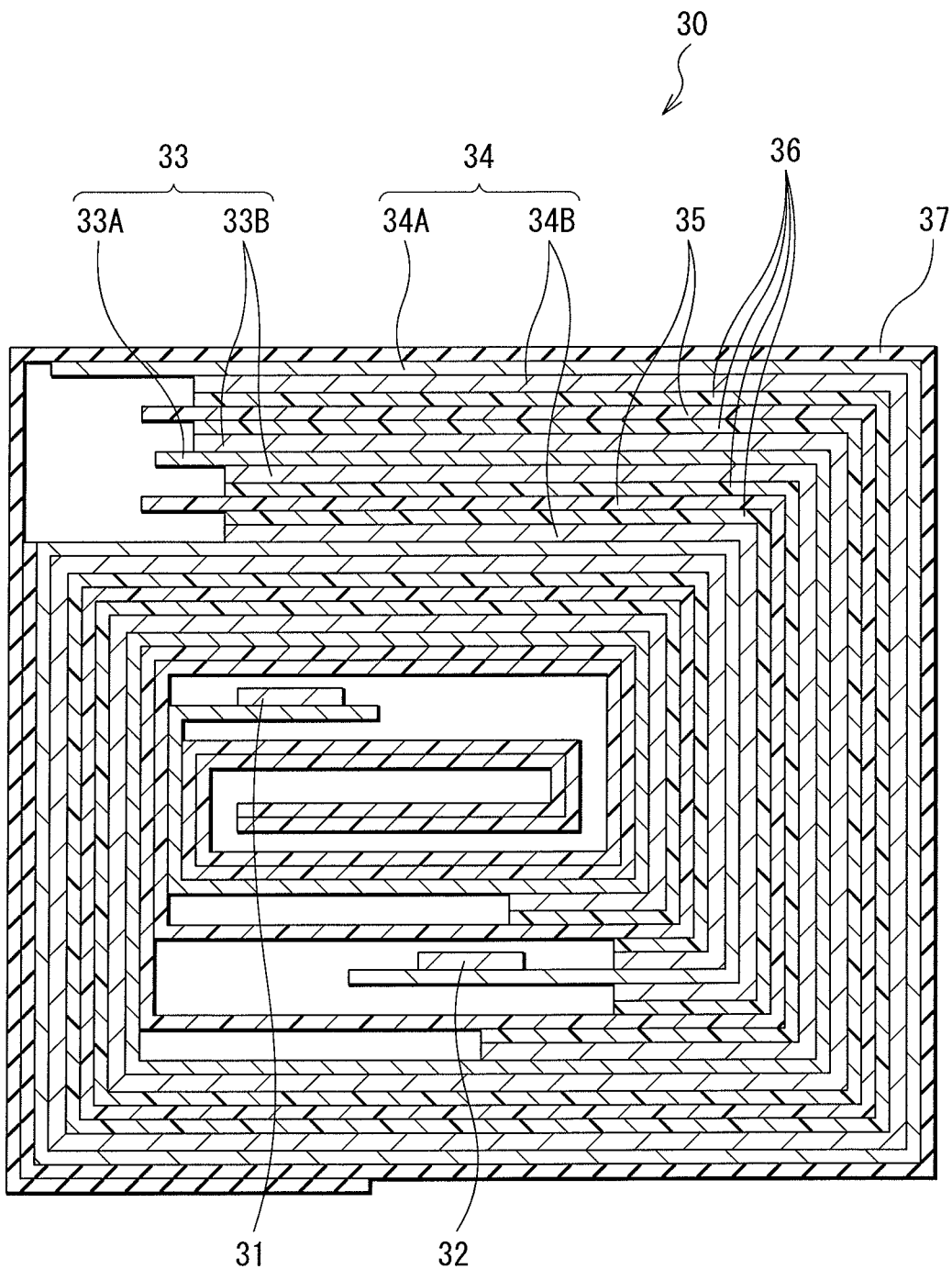
FIG. 5 A cross-sectional view illustrating a configuration of the coiled electrode body shown in FIG. 4 taken along a line V-V.

It is to be noted that the secondary battery according to the present embodiment may be applied to that of a type other than the cylinder type. FIG. 4 and FIG. 5 illustrate an exploded perspective configuration of the second secondary battery and a cross-sectional configuration of a coiled electrode body 30 shown in FIG. 4 taken along a line V-V, respectively. In the following, description will be given on component elements of the laminate film type, with reference to the component elements of the cylinder type already described above as needed.

This secondary battery is a lithium ion secondary battery as in the first secondary battery. As shown in FIG. 4, the coiled electrode body 30 is accommodated inside of a film-like exterior member 40. The coiled electrode body 30 is attached with a positive electrode lead 31 and a negative electrode lead 32.

The positive electrode lead 31 and the negative electrode lead 32 may be led from the inside of the exterior member 40 to the outside in the same direction, for example. The positive electrode lead 31 may be configured of a metallic material such as aluminum, and the negative electrode lead 32 may be configured of a metallic material such as copper, nickel, and stainless steel, for example. These materials may have a shape of a thin plate or a mesh, for example.

The exterior member 40 may be a laminate film in which a fusion layer, a metal layer, and a surface protection layer are stacked in this order, for example. In the laminate films, external edges in the fusion layers of the two sheets of film are so attached to each other, such as by a fusion bonding and an adhesive, that the fusion layers oppose the coiled electrode body 30. The fusion layer may be a polymer film such as polyethylene and polypropylene, for example. The metal layer may be a metal foil such as an aluminum foil, for example. The surface protection layer may be a polymer film such as nylon and polyethylene terephthalate, for example.

In particular, an aluminum laminate film in which a polyethylene film, an aluminum foil, and a nylon film are stacked in this order is preferable for the exterior member 40. However, a laminate film having other laminated structure, a polymer film such as polypropylene, or a metal film may be used in place of the aluminum laminate film.

A contact film 41 for preventing intrusion of the air is inserted between the exterior member 40 and the positive electrode lead 31 and between the exterior member 40 and the negative electrode lead 32. This contact film 41 is configured of a material having a property of close-attachment to the positive electrode lead 31 and to the negative electrode lead 32. Such material can be a polyolefin resin such as polyethylene, polypropylene, modified polyethylene, and modified polypropylene, for example.

In the coiled electrode body 30, a positive electrode 33 and a negative electrode 34 are laminated with a separator 35 and an electrolyte layer 36 in between and are winded, and an outermost circumference thereof is protected by a protective tape 37, as illustrated in FIGS. 3 and 5. In the positive electrode 33, a positive electrode active material layer 33B is provided on both sides of a positive electrode current collector 33A, which have configurations similar to those of the positive electrode current collector 21A and the positive electrode active material layer 21B, for example. In the negative electrode 34, a negative electrode active material layer 34B is provided on both sides of a negative electrode current collector 34A, which have configurations similar to those of the negative electrode current collector 22A and the negative electrode active material layer 22B, for example. The separator 35 has a configuration similar to that of the separator 23.

The electrolyte layer 36 is that in which an electrolyte is retained by a polymeric compound, and may include other material such as various additives on an as-needed basis. The electrolyte layer 36 is in a so-called gel-like state, which is preferable in that a high ionic conductivity (for example, 1 mS/cm or more at the room temperature) can be obtained and that a liquid leakage of the electrolyte is prevented.

For example, the polymer compound can be one or two or more kinds of the following polymeric materials. Polyacrylonitrile, vinylidene polyfluoride, polytetrafluoroethylene, polyhexafluoropropylene, polyethylene oxide, polypropylene oxide, polyphosphazene, polysiloxane, and vinyl polyfluoride. Vinyl polyacetate, polyvinyl alcohol, methyl polymethacrylate, polyacrylic acid, polymethacrylic acid, styrene-butadiene rubber, nitrile-butadiene rubber, polystyrene, and polycarbonate. A copolymer of vinylidene fluoride and hexafluoropyrene. In particular, vinylidene polyfluoride or the copolymer of vinylidene fluoride and hexafluoropyrene is preferable, since they are electrochemically stable.

The electrolyte has a composition similar to that of the electrolyte in the first secondary battery. However, a solvent in the gel-like electrolyte layer 36 is a broad concept that encompasses not only a solvent in a liquid form but also a solvent having an ionic conductivity capable of dissociating an electrolyte salt. Thus, in a case where a polymer compound having the ionic conductivity is used, that polymer compound is encompassed as the solvent.

It is to be noted that the electrolyte may be used as it is in place of the gel-like electrolyte layer 36 in which the electrolyte is retained by the polymeric compound. In this case, the electrolyte is impregnated in the separator 35.

In this secondary battery, the lithium ions are released from the positive electrode 33 and are stored in the negative electrode 34 through the electrolyte layer 36 at the time of charging, for example. On the other hand, the lithium ions are released from the negative electrode 34 and are stored in the positive electrode 33 through the electrolyte layer 36 at the time of discharging, for example.

The secondary battery provided with the gel-like electrolyte layer 36 may be manufactured by three types of procedures described below, for example.

In a first manufacturing method, the positive electrode 33 and the negative electrode 34 are fabricated first by a procedure similar to that of the positive electrode 21 and the negative electrode 22. More specifically, the positive electrode active material layer 33B is formed on the positive electrode current collector 33A to fabricate the positive electrode 33, and the negative electrode active material layer 34B is formed on the negative electrode current collector 34A to fabricate the negative electrode 34. Then, a precursor solution containing the electrolyte, the polymer compound, and the solvent is prepared and is coated on the positive electrode 33 and the negative electrode 34, following which the solvent is evaporated to form the gel-like electrolyte layer 36. Then, the positive electrode lead 31 is connected to the positive electrode current collector 33A, and the negative electrode lead 32 is connected to the negative electrode current collector 34A. Then, the positive electrode 33 and the negative electrode 34 formed with the electrolyte layer 36 are laminated with the separator 35 in between and are winded, following which the protective tape 37 is adhered to the outermost circumference thereof to thereby fabricate the coiled electrode body 30. Lastly, the coiled electrode body 30 is sandwiched between the two sheets of film-like exterior member 40, following which external edges of the exterior members 40 are adhered to each other such as by a thermal fusion bonding to seal the coiled electrode body 30. At this time, the contact film 41 is inserted between the positive electrode lead 31 and the exterior member 40 and between the negative electrode lead 32 and the exterior member 40. Thereby, the secondary battery shown in FIG. 4 and FIG. 5 is completed.

In a second manufacturing method, first, the positive electrode lead 31 is connected to the positive electrode 33 and the negative electrode lead 32 is connected to the negative electrode 34. Then, the positive electrode 33 and the negative electrode 34 are laminated with the separator 35 in between and are winded, following which the protective tape 37 is adhered to the outermost circumference thereof to thereby fabricate a coiled body as a precursor of the coiled electrode body 30. Then, the coiled body is sandwiched between the two sheets of film-like exterior member 40, following which, excluding an outer circumferential edge on one side thereof, remaining outer circumferential edges thereof are adhered such as by a thermal fusion bonding to accommodate the coiled body inside the bag-like exterior member 40. Then, an electrolyte composition containing: the electrolyte; a monomer as a raw material of the polymer compound; a polymerization initiator; and other material such as a polymerization inhibitor where necessary, is prepared to inject the same into inside of the bag-like exterior member 40, following which an opening of the exterior member 40 is sealed such as by a thermal fusion bonding. Lastly, the monomer is subjected to thermal polymerization to provide the polymer compound to thereby form the gel-like electrolyte layer 36. Thus, the secondary battery is completed.

In a third manufacturing method, the coiled body is formed first to accommodate the same into inside of the bag-like exterior member 40 as in the second manufacturing method, except for the use of the separator 35 in which the polymer compound is coated on both sides thereof. The polymer compound to be coated on the separator 35 can be, for example, a polymer (such as homopolymer, copolymer, and multi-copolymer) having vinylidene fluoride as the component, and, more specifically, can be such as: vinylidene polyfluoride; a binary copolymer having vinylidene fluoride and hexafluoropropylene as the components; and a ternary copolymer having vinylidene fluoride, hexafluoropropylene, and chrorotrifluoroethylene as the components. Note that the polymer compound may include, in addition to the polymer having vinylidene fluoride as the component described above, other one or two or more kinds of polymer compounds. Then, the electrolyte is prepared to inject the same into inside of the exterior member 40, following which an opening of the exterior member 40 is sealed such as by a thermal fusion bonding. Lastly, the exterior member 40 is heated while a weight is imposed thereon to closely attach the separator 35 to the positive electrode 33 and to the negative electrode 34 via the polymer compound. Thereby, the electrolyte is impregnated in the polymer compound, and that polymer compound is gelled to form the electrolyte layer 36. Thus, the secondary battery is completed.

In the third manufacturing method, an battery expansion is suppressed more than in the first manufacturing method. Also, the monomer as a raw material of the polymer compound, the solvent, or the like hardly remains in the electrolyte layer 36 as compared with the second manufacturing method. Thus, a formation step of the polymer compound is well controlled. Hence, a sufficient property of close-attachment is obtained between the positive electrode 33 and the electrolytic layer 36, between the negative electrode 34 and the electrolytic layer 36, and between the separator 35 and the electrolytic layer 36.

According to the second secondary battery, the positive electrode active material layer 33B has the configuration similar to that of the positive electrode active material layer 21B. Therefore, it is possible to improve charge-discharge characteristics for a reason similar to that of the first secondary battery.

[3. Third Secondary Battery (Lithium Metal Secondary Battery)]

It is to be noted that the secondary battery according to the present embodiment may be applied to a lithium metal secondary battery in which a capacity of the negative electrode 22 is expressed by deposition and dissolution of a lithium metal. A third secondary battery has a configuration similar to that of the first secondary battery and is manufactured by a procedure similar thereto, except that the negative electrode active material layer 22B is configured by a lithium metal.

This secondary battery uses a lithium metal as a negative electrode active material, to thereby make it possible to achieve a high energy density. The negative electrode active material layer 22B may be present already from the time of assembly. However, the negative electrode active material layer may not be present at the time of the assembly, and may be formed by a lithium metal deposited at the time of charging. Also, the negative electrode active material layer 22B may be used also as a current collector to eliminate the negative electrode current collector 22A.

In this secondary battery, the lithium ions are released from the positive electrode 21, and are deposited as the lithium metal on a surface of the negative electrode current collector 22A through the electrolyte impregnated in the separator 23 at the time of charging, for example. On the other hand, the lithium metal is eluted as the lithium ions from the negative electrode active material layer 22B, which are stored in the positive electrode 21 through the electrolyte impregnated in the separator 23 at the time of discharging, for example.

According to the third secondary battery, the positive electrode active material layer 33B has the configuration similar to that of the positive electrode active material layer 21B as well. Therefore, it is possible to improve charge-discharge characteristics for a reason similar to that of the first secondary battery. As a matter of course, the third secondary battery is not limited to the cylinder type described for the first secondary battery, and may be applied to the laminate film type described for the second secondary battery.

EXAMPLES

Next, Examples of the invention will be described in detail.

Experiment Examples 1-1 to 1-20

Figure 6:
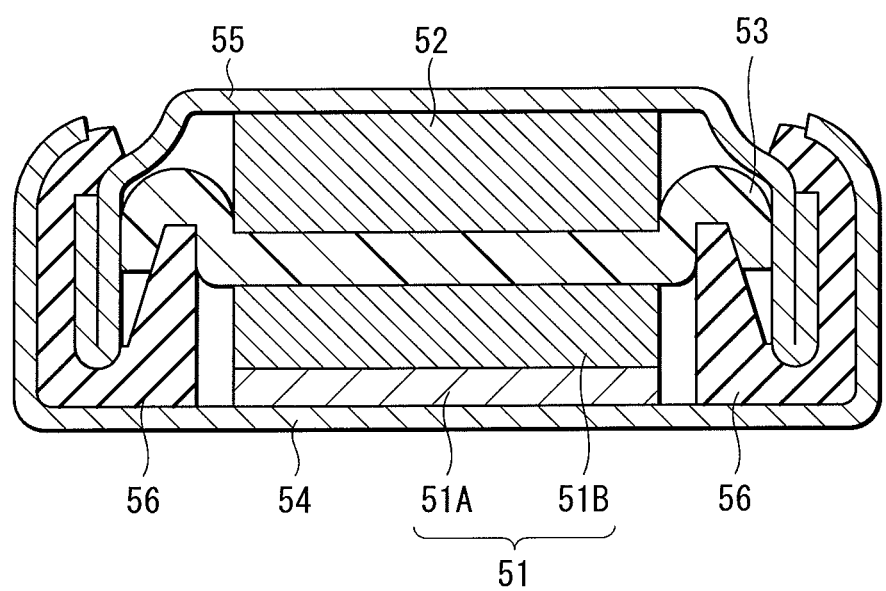
FIG. 6 A cross-sectional view illustrating a configuration of a secondary battery (a coin type) fabricated in Examples.

A coin-type lithium metal secondary battery shown in FIG. 6 was fabricated by a procedure described below. This secondary battery is that in which an exterior can 54 accommodating therein a positive electrode 51 and an exterior cup 55 accommodating therein a negative electrode 52 are swaged through a separator 53 and a gasket 56.

First, the positive electrode 51 was fabricated. At the beginning, lithium carbonate ($Li_2CO_3$), manganese oxide ($MnO_2$), and nickel oxide (NiO) were weighed such that they have a predetermined mole ratio, following which they were mixed using a ball mill. Then, the mixture was baked under the atmosphere for 10 hours at a temperature of 800 degrees centigrade, and cooling was performed thereafter. Then, the mixture was mixed again using a ball mill, following which the same was baked under the atmosphere for 10 hours at a temperature of 700 degrees centigrade to obtain a lithium-nickel-manganese composite oxide ($LiNi_{0.5}Mn_{1.5}O_4$) as the high-voltage operating positive electrode material. Then, the $LiNi_{0.5}Mn_{1.5}O_4$ as the positive electrode active material; acetylene black (the amorphous carbon material) and black lead (the crystalline carbon material) as the positive electrode conductive agent; and vinylidene polyfluoride as the positive electrode binder, were mixed to provide the positive electrode mixture. In this case, the interplanar spacing, the specific surface area, and the content of the amorphous carbon material and of the crystalline carbon material were set as shown in Table 1 to Table 5. The black lead as the crystalline carbon material was obtained by baking petroleum pitch as a raw material at a temperature from 1000 degrees centigrade to 2800 degrees centigrade, and the baking temperature thereof was changed to control the interplanar spacing. As for a mixing ratio (a mass ratio) of the positive electrode active material, the positive electrode conductive agent, and the positive electrode binder, a ratio of the positive electrode binder was 2.5 pts. mass and was constant, and the remaining ratio was shared by the positive electrode active material and the positive electrode conductive agent. Namely, the ratio of the positive electrode active material is the remaining ratio excluding the ratio of the positive electrode conductive agent and the positive electrode binder from the total. Then, the positive electrode mixture was dispersed in N-methyl-2-pyloridon to provide the paste-like positive electrode mixture slurry. Then, the positive electrode mixture slurry was coated on a positive electrode current collector 51A configured of an aluminum foil (15 μm thick), following which a compression molding was performed using a roll pressing machine to form a positive electrode active material layer 51B. Lastly, the positive electrode current collector 51A formed with the positive electrode active material layer 51B was punched into a pellet having a diameter of 15 mm.

Then, as the solvent, ethylene carbonate (EC) and dimethyl carbonate (DMC) were mixed, following which, as the electrolyte salt, lithium phosphate hexafluoride ($LiPF_6$) was dissolved to prepare the electrolyte. In this case, a mixing ratio (a mass ratio) of the solvent was EC:DMC=1:1, and the content of the electrolyte salt for the solvent was 1 mol/kg.

Lastly, the positive electrode 51 and the negative electrode 52 (a pellet-like lithium metal plate) were laminated with the separator 53 configured of a micro-porous polypropylene film (20 μm thick) in between, following which the resultant was accommodated in an exterior can 54. Then, the electrolyte was impregnated in the separator 53, following which, through the gasket 56, the exterior cup 55 was overlaid and swaged. Thereby, the coin-type secondary battery was completed.

Examination of charge-discharge characteristics (a capacity retention rate) was performed on the secondary batteries according to the Experiment Examples 1-1 to 1-20. The results shown in Table 1 to Table 5 were obtained accordingly.

In determining the capacity retention rate, two cycles of charging and discharging were performed under an atmosphere of 45 degrees centigrade to measure a discharge capacity, following which the charging and discharging were repeated under the same atmosphere until a total of the number of cycles reached 50 cycles to measure a discharge capacity. From this result, the capacity retention rate (%)=(discharge capacity in the 50th cycle/discharge capacity in the second cycle)×100 was calculated. In this case, charging was performed with a current of 0.3 mA until a voltage reached 4.95 V, and further charging was performed at the same voltage until the current reached 0.03 mA (constant-current constant-voltage charging), following which constant-current discharging was performed with the current of 0.3 mA until the voltage reached 3 V.

TABLE 1

Positive electrode active material: $LiNi_{0.5}Mn_{1.5}O_4$

| | Amorphous Carbon Material | | Crystalline Carbon Material | | | |
|---|---|---|---|---|---|---|
| | Specific Surface Area ($m^2/g$) | Content (Mass %) | Interplanar Spacing (nm) | Specific Surface Area ($m^2/g$) | Content (Mass %) | Capacity Retention Rate (%) |
| E. Example 1-1 | 40 | 2.5 | 0.340 | 2 | 2.5 | 53 |
| E. Example 1-2 | 50 | | | | | 65 |
| E. Example 1-3 | 80 | | | | | 68 |
| E. Example 1-4 | 100 | | | | | 60 |
| E. Example 1-5 | 120 | | | | | 48 |

TABLE 2

Positive electrode active material: $LiNi_{0.5}Mn_{1.5}O_4$

| | Amorphous Carbon Material | | Crystalline Carbon Material | | | |
|---|---|---|---|---|---|---|
| | Specific Surface Area ($m^2/g$) | Content (Mass %) | Interplanar Spacing (nm) | Specific Surface Area ($m^2/g$) | Content (Mass %) | Capacity Retention Rate (%) |
| E. Example 1-6 | 80 | 0.3 | 0.340 | 2 | 2.5 | 51 |
| E. Example 1-7 | | 0.5 | | | | 64 |
| E. Example 1-3 | | 2.5 | | | | 68 |
| E. Example 1-8 | | 5 | | | | 61 |
| E. Example 1-9 | | 6 | | | | 52 |

TABLE 3

Positive electrode active material: $LiNi_{0.5}Mn_{1.5}O_4$

| | Amorphous Carbon Material | | Crystalline Carbon Material | | | |
|---|---|---|---|---|---|---|
| | Specific Surface Area ($m^2/g$) | Content (Mass %) | Interplanar Spacing (nm) | Specific Surface Area ($m^2/g$) | Content (Mass %) | Capacity Retention Rate (%) |
| E. Example 1-10 | 80 | 2.5 | 0.340 | 0.5 | 2.5 | 54 |
| E. Example 1-11 | | | | 1 | | 62 |
| E. Example 1-3 | | | | 2 | | 68 |
| E. Example 1-12 | | | | 5 | | 60 |
| E. Example 1-13 | | | | 7 | | 49 |

TABLE 4

Positive electrode active material: $LiNi_{0.5}Mn_{1.5}O_4$

| | Amorphous Carbon Material | | Crystalline Carbon Material | | | |
|---|---|---|---|---|---|---|
| | Specific Surface Area ($m^2/g$) | Content (Mass %) | Interplanar Spacing (nm) | Specific Surface Area ($m^2/g$) | Content (Mass %) | Capacity Retention Rate (%) |
| E. Example 1-14 | 80 | 2.5 | 0.340 | 2 | 0.3 | 54 |
| E. Example 1-15 | | | | | 0.5 | 61 |
| E. Example 1-3 | | | | | 2.5 | 68 |
| E. Example 1-16 | | | | | 5 | 60 |
| E. Example 1-17 | | | | | 6 | 50 |

TABLE 5

Positive electrode active material: $LiNi_{0.5}Mn_{1.5}O_4$

| | Amorphous Carbon Material | | Crystalline Carbon Material | | | |
|---|---|---|---|---|---|---|
| | Specific Surface Area ($m^2/g$) | Content (Mass %) | Interplanar Spacing (nm) | Specific Surface Area ($m^2/g$) | Content (Mass %) | Capacity Retention Rate (%) |
| E. Example 1-18 | 80 | 2.5 | 0.336 | 2 | 2.5 | 53 |
| E. Example 1-3 | | | 0.340 | | | 68 |
| E. Example 1-19 | | | 0.343 | | | 60 |
| E. Example 1-20 | | | 0.344 | | | 54 |

In the cases where $LiNi_{0.5}Mn_{1.5}O_4$ was used as the positive electrode active material, the specific surface area and the content of the amorphous carbon material as well as the interplanar spacing, the specific surface area, and the content of the crystalline carbon material were optimized, by which the capacity retention rate was increased. The ranges of optimization were as follows: the specific surface area=50 $m^2/g$ to 100 $m^2/g$ and the content=0.5 mass % to 5 mass % for the amorphous carbon material. Also, for the crystalline carbon material, the interplanar spacing=0.340 nm to 0.343 nm, the specific surface area=1 $m^2/g$ to 5 $m^2/g$, and the content=0.5 mass % to 5 mass %.

Experiment Examples 2-1 to 2-4

Procedures similar to those of the Experiment Examples 1-1 to 1-20 were carried out, except that lithium-chromium-manganese composite oxide ($LiCr_{0.5}Mn_{1.5}O_4$) or lithium-cobalt-phosphate compound ($LiCoPO_4$) was used for the positive electrode active material. In these cases, the interplanar spacing, the specific surface area, and the content of the amorphous carbon material and of the crystalline carbon material were set as shown in Table 6 and Table 7. In obtaining $LiCr_{0.5}Mn_{1.5}O_4$, lithium hydroxide (LiOH), $MnO_2$, and chromium oxide ($Cr_2O_3$) were mixed. On the other hand, $Li_2CO_3$, cobalt oxide (CoO), and ammonium phosphate (($NH_4$)$_2HPO_4$) were mixed in obtaining $LiCoPO_4$. A procedure other than this was similar to that of the case in which $LiNi_{0.5}Mn_{1.5}O_4$ was obtained.

Examination of charge-discharge characteristics (an initial efficiency) was performed on the secondary batteries according to the Experiment Examples 2-1 to 2-4. The results shown in Table 6 and Table 7 were obtained accordingly.

In determining the initial efficiency, charging was performed under an atmosphere of 25 degrees centigrade to measure a charge capacity, following which discharging was performed under the same atmosphere to measure a discharge capacity. From this result, the initial efficiency (%)=(discharge capacity/charge capacity)×100 was calculated. In this case, charging was performed with a current of 0.3 mA until a voltage reached 5.1 V, and further charging was performed at the same voltage until the current reached 0.03 mA (constant-current constant-voltage charging), following which constant-current discharging was performed with the current of 0.3 mA until the voltage reached 3 V.

TABLE 6

Positive electrode active material: $LiCr_{0.5}Mn_{1.5}O_4$

| | Amorphous Carbon Material | | Crystalline Carbon Material | | | |
|---|---|---|---|---|---|---|
| | Specific Surface Area ($m^2/g$) | Content (Mass %) | Interplanar Spacing (nm) | Specific Surface Area ($m^2/g$) | Content (Mass %) | Initial Efficiency (%) |
| E. Example 2-1 | 80 | 2.5 | 0.336 | 2 | 2.5 | 53 |
| E. Example 2-2 | | | 0.340 | | | 65 |

TABLE 7

Positive electrode active material: $LiCoPO_4$

| | Amorphous Carbon Material | | Crystalline Carbon Material | | | |
|---|---|---|---|---|---|---|
| | Specific Surface Area ($m^2/g$) | Content (Mass %) | Interplanar Spacing (nm) | Specific Surface Area ($m^2/g$) | Content (Mass %) | Initial Efficiency (%) |
| E. Example 2-3 | 80 | 2.5 | 0.336 | 2 | 2.5 | 58 |
| E. Example 2-4 | | | 0.340 | | | 70 |

A result similar to that of the case where $LiNi_{0.5}Mn_{1.5}O_4$ was used was obtained also in the case where $LiCr_{0.5}Mn_{1.5}O_4$ or $LiCoPO_4$ was used as the positive electrode active material.

It was confirmed from the results in the Table 1 to Table 7 described above that the charge-discharge characteristics improve when the interplanar spacing, the specific surface area, and the content of the amorphous carbon material and the crystalline carbon material as the positive electrode conductive agent are in the normalized ranges, in a case where the high-voltage operating positive electrode material is used as the positive electrode active material.

It is to be noted that the cases where the lithium metal is used for the negative electrode (the lithium metal secondary battery) have been described in the Examples described above, for the purpose of simplifying contents of the Experiments. However, a similar result should be obtained as well in a case where a material such as a carbon material and a metallic material is used for the negative electrode active material (a lithium-ion secondary battery). This is because, in the invention, a feature reside in conditions of the configuration of the positive electrode (the kind of the positive electrode active material, and the kind and the property of the positive electrode conductive agent), and operation and effect of the invention are achieved based on that feature. Hence, in the case where the carbon material or the metallic material is used, an absolute value such as of the capacity retention rate may vary as compared with the case where the lithium metal is used, but an effect of the invention by which the charge-discharge characteristics improve should certainly be achieved.

Although the invention has been described in the foregoing with reference to the embodiment and the Examples, the invention is not limited to the modes described in the embodiment and the Examples but may be modified in a wide variety of ways. For example, the capacity of the negative electrode may include a capacity derived from the storage and the release of the lithium ions and a capacity derived from the deposition and the dissolution of the lithium metal, and may be expressed by a sum of those capacities. In this case, a negative electrode material capable of storing and releasing the lithium ions is used for the negative electrode active material, and a chargeable capacity of the negative electrode material is set to be smaller than a discharge capacity of the positive electrode.

Also, a structure of the battery may be such as of an angular type and a button type, and a structure of a battery device may be such as a laminated structure.

Also, an element of the electrode reacting substance may be another group 1 element such as sodium (Na) and potassium (K), may be a group 2 element such as magnesium and calcium, or may be other light metal such as aluminum. An effect of the invention should be achieved without depending upon kinds of elements of the electrode reacting substance. Thus, a similar effect can be achieved even when the kinds thereof are altered.

Also, although the description has been made for the interplanar spacing of the amorphous carbon material as to the normalized range drawn from the results according to the Examples, the description thereon does not completely deny a possibility that the interplanar spacing may become outside the range described above. That is, the normalized range described above is basically a range which is particularly preferable in achieving an effect of the invention. Thus, the interplanar spacing may be, to a certain degree, deviated from the range described above as long as an effect of the invention is achieved. The same is true for the specific surface area and the content of the amorphous carbon material and of the crystalline carbon material.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery, comprising:
a positive electrode including a positive electrode active material layer having a positive electrode active material and a positive electrode conductive agent;
a negative electrode; and
an electrolyte containing an electrolyte salt and a solvent,
wherein an operating voltage of the positive electrode active material is equal to or more than 4.5 V on a lithium metal (Li) basis, and
the positive electrode conductive agent contains an amorphous carbon material and a crystalline carbon material, a specific surface area of the amorphous carbon material lying between 50 m$^2$/g and 100 m$^2$/g both inclusive, a content of the amorphous carbon material in the positive electrode active material layer lying between 0.5 mass % and 5 mass % both inclusive, an interplanar spacing for lattice plane (002) of the crystalline carbon material being equal to or more than 0.340 nm when measured by an X-ray diffraction method, a specific surface area of the crystalline carbon material lying between 1 m$^2$/g to 5 m$^2$/g both inclusive, and a content of the crystalline carbon material in the positive electrode active material layer lying between 0.5 mass % to 5 mass % both inclusive.

2. The secondary battery according to claim 1, wherein the interplanar spacing of the crystalline carbon material is equal to or less than 0.343 nm.

3. The secondary battery according to claim 1, wherein the amorphous carbon material is an acetylene black, and the crystalline carbon material is a black-lead.

4. The secondary battery according to claim 1, wherein the positive electrode active material is a lithium-manganese-based composite oxide expressed by a following formula (1) or a lithium cobalt phosphate compound (LiCoPO$_4$):

$$LiM_xMn_{2-x}O_4 \qquad (1),$$

where M represents at least one of nickel (Ni), cobalt (Co), iron (Fe), chromium (Cr), and copper (Cu), a value of x satisfying $0<x\leq1$.

5. The secondary battery according to claim 4, wherein the positive electrode active material is a lithium-nickel-manganese composite oxide (LiNi$_{0.5}$Mn$_{1.5}$O$_4$), a lithium-chromium-manganese composite oxide (LiCr$_{0.5}$Mn$_{1.5}$O$_4$), or a lithium-cobalt phosphate compound.

6. The secondary battery according to claim 1, wherein the positive electrode active material layer contains a positive electrode binder.

7. A positive electrode for a secondary battery, comprising:
a positive electrode active material layer having a positive electrode active material and a positive electrode conductive agent,
wherein an operating voltage of the positive electrode active material is equal to or more than 4.5 V on a lithium metal basis, and
the positive electrode conductive agent contains an amorphous carbon material and a crystalline carbon material, a specific surface area of the amorphous carbon material lying between 50 m$^2$/g and 100 m$^2$/g both inclusive, a content of the amorphous carbon material in the positive electrode active material layer lying between 0.5 mass % and 5 mass % both inclusive, an interplanar spacing for lattice plane (002) of the crystalline carbon material being equal to or more than 0.340 nm when measured by an X-ray diffraction method, a specific surface area of the crystalline carbon material lying between 1 m$^2$/g to 5 m$^2$/g both inclusive, and a content of the crystalline carbon material in the positive electrode active material layer lying between 0.5 mass % to 5 mass % both inclusive.

* * * * *